March 8, 1927. 1,619,996
C. J. WHITACRE
CLOSURE
Filed Dec. 4, 1922
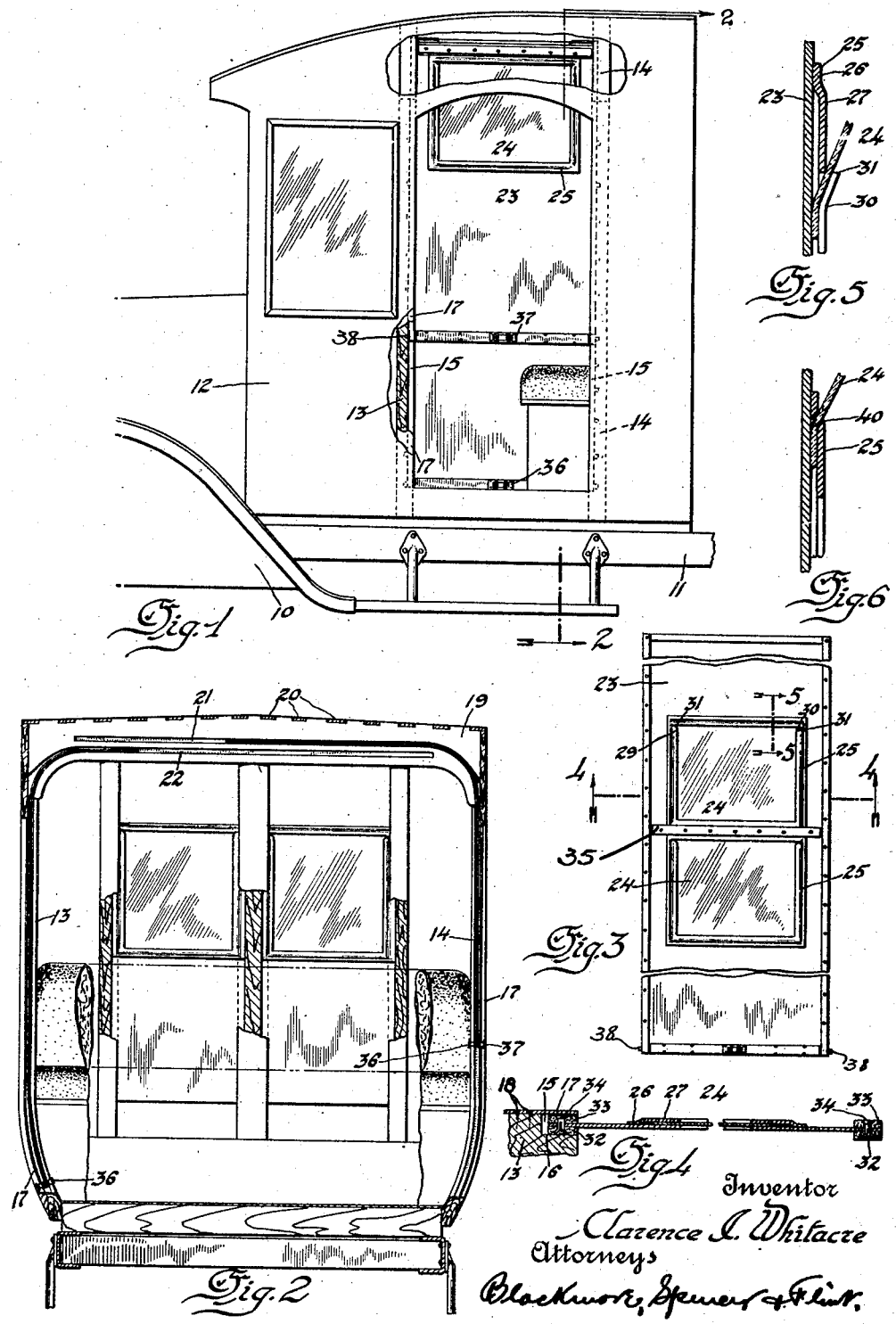

Patented Mar. 8, 1927.

1,619,996

UNITED STATES PATENT OFFICE.

CLARENCE J. WHITACRE, OF JANESVILLE, WISCONSIN, ASSIGNOR TO GENERAL MOTORS CORPORATION, OF DETROIT, MICHIGAN, A CORPORATION OF DELAWARE.

CLOSURE.

Application filed December 4, 1922. Serial No. 604,775.

This invention relates to closures and more particularly to doors or windows for motor vehicles.

The principal objects of the invention are the production of a flexible closure that is simple in construction, cheap to manufacture, easily manipulated, strong, durable, and one that is readily assembled and is not likely to get out of order.

Other and further objects and advantages of the invention will appear from the description taken in connection with the drawings, in which, Fig. 1, is a side elevation of a portion of a vehicle with my improved closure in position therein.

Fig. 2, is a cross-sectional view on line 2—2, of Fig. 1.

Fig. 3, is a side elevation of the closure.

Fig. 4, is a section on line 4—4, of Fig. 3.

Fig. 5 is a section on line 5—5, of Fig. 3 and,

Fig. 6, is a similar view of a modified form of the device.

On the drawings, the reference character 10 designates a motor vehicle including the chassis frame 11 on which is mounted the body 12. The body 12 may be of any suitable construction but for simplicity in illustration, and convenience in description, it is here shown as a cab and the vehicle 10 is represented as a truck. The cab is provided with suitable supports at each side and end thereof. A pair of these supports 13 and 14 at each side of the cab are spaced apart a sufficient distance to form a doorway or opening in the cab. Since the doorway and door at each side of the cab are duplicates, only one set need be described.

The supports 13 and 14 at each side of the cab are provided with guides or channels 15. These guides may be formed in any suitable manner. As shown, the supports 13 and 14 are rabbeted on their adjacent faces, as indicated at 16 in Fig. 4, and a plate 17 is secured to each support as by the fastening means 18 in such a manner that it overlaps the rabbet thereby forming the guide or channel 15.

Transverse supporting members 19 extending across the cab are connected to the upper ends of the supports 13 and 14 and are adapted to have the longitudinally extending members 20 secured thereto for supporting the top fabric, as is usual in such constructions. The transverse members 19 are provided with grooves 21 and 22 in the side faces thereof. These grooves extend horizontally across the top of the cab and have their outer ends curved downwardly so they are in alinement with the guides or grooves 15 in the supports 13 and 14.

Doors or closures which may be in the form of a rectangle are provided for the closure openings and are adapted to slide in said grooves. Each closure is composed of a flexible body portion 23 which may be made of suitable material having sufficient rigidity that it may be slid up and down and at the same time having sufficient flexibility to permit it to follow the curves of said guides. Preferably these closures are formed from fine gage sheet metal. The body portion may be provided with any desirable number of openings in which are adapted to be secured windows 24 of pyrrolin or any other suitable flexible transparent material.

The windows may be secured in position in any suitable manner. They are preferably removably secured in order that they may be replaced when torn or damaged. As shown, a light metallic frame 25 conforming to the shape of the opening in the body 23 is secured about each of said openings by spot welding the same to said body portion. The frame 25, see Figs. 3, 4 and 5, is provided with an attaching portion 26 and an offset guide portion 27. The attaching portion 26 is rigidly attached to the body portion 23 of the closure in any suitable manner as by spot welding. The upper ends of the side members 29 and 30 of the frame 25 may be bent outwardly as shown at 31, whereby the window 24 may be removed or inserted.

The side and end edges of the body portion 23 may be provided with a binding to prevent rattling of said door. One form of binding is shown in Fig. 4, in which two strips of commercial anti-squeak material 32 and 33 are employed and between which the door is adapted to be secured by any suitable means such as the rivets 34. The door may be provided with a suitable number of strengthening ribs 35 extending transversely thereof. The side edges of the doors are adapted to be slidably mounted in the grooves 15. They are adapted to be moved upwardly in the grooves 21 and 22 into inoperative position one above the other across the upper portion of the cab. Handles 36 and 37 are secured to the inner and outer sides of the lower portion of the closure for raising and lowering the same. If desired, any suitable means may be provided for holding the door in its adjusted position, such as the usual manually operated spring pressed bolts 38.

In Fig. 6 of the drawing is shown a modified form of the device in which the upper horizontal portion of the frame 25 is provided with a slot 40 through which the window 24 may be inserted or removed.

It will be understood that various changes in the form, construction, composition and arrangement of the several parts may be resorted to without departing from the spirit and scope of my invention; hence I do not wish to limit myself strictly to the structure herein set forth, but,

What I claim is:

1. In a device of the class described, an automobile body including supports spaced apart for forming an opening in said body, said supports being provided with guides, a sheet metal closure slidably mounted in said guides, said closure being provided with an opening therein and a transparent flexible window removably mounted in said opening.

2. In a device of the class described, a flexible sheet metal closure having an opening therein, a rectangular frame secured to said closure and having an offset to form a channel about said opening, said frame being provided with a slot in its upper portion and flexible transparent window member insertable through said slot into said channel.

3. In a cab for vehicles, upright supporting members at each side of said cab, transverse members connecting the upper ends of said upright members, said members having grooves formed therein, a sheet metal closure mounted in said guides and adapted to be moved from a substantially vertical position to a substantially horizontal position in the upper portion of said cab, and a binding member secured to the side edges of said closure for cushioning said closure.

4. A closure for cab openings, including oppositely disposed guides, a single sheet of thin gauge metal having sliding engagement in said guides over the cab opening, strips of anti-squeak material bounding the opposite sides of the metallic sheet edges within said guides, a reinforcing strip of metal extending transversely across said metallic sheet intermediate its ends, said metallic sheet being provided with an opening therein, a metallic frame having an offset portion welded about the margin of said opening, one side of the frame being provided with a slot extending entirely thereacross, and a flexible transparency insertable thru said slot into the frame forming a removable window.

5. A sheet metal closure having an opening therein, a frame having an offset portion secured to said closure about said opening, the top portion of said frame being provided with a slot extending the full width of said opening.

6. A sheet metal closure having an opening therein, a frame having an offset portion secured to said closure about said opening for forming a recess about the same, said frame being slotted for the reception of a window into said recess.

7. An automobile body comprising a top portion and side portions supporting the top portion, openings in said side portions, spaced overlapping guide ways in said top portions and spaced guideways in said side portions arranged on either side of said openings, said guide ways being arranged to provide two sets of continuous L-shaped guides each extending along one side and the top of the vehicle, closures for said openings formed of flexible sheet metal each having its edge portions cooperating with one set of said guides for sliding movement therein, and binding means secured to said edge portions and engaging said guides for cushioning the sliding movement and eliminating rattling.

8. The structure as defined by claim 7, the closures having openings therein, frames secured around the openings, one side of each of said frames being slotted to receive a transparent panel for seating in said frame.

In testimony whereof I affix my signature.

CLARENCE J. WHITACRE.